United States Patent
Schloetterer et al.

[11] Patent Number: 5,831,158
[45] Date of Patent: Nov. 3, 1998

[54] COMBINATION WATER METER

[75] Inventors: Werner Schloetterer, Flachslanden; Ewald Lacher, Ansbach, both of Germany

[73] Assignee: Hydrometer GmbH, Ansbach, Germany

[21] Appl. No.: 899,035

[22] Filed: Jul. 23, 1997

[30] Foreign Application Priority Data

Jul. 26, 1996 [DE] Germany ............ 196 30 158.0

[51] Int. Cl.⁶ .................................................. G01F 7/00
[52] U.S. Cl. .......................................................... 73/197
[58] Field of Search ................................................ 73/197

[56] References Cited

U.S. PATENT DOCUMENTS

| | | | |
|---|---|---|---|
| 3,616,814 | 11/1971 | Hendey | 73/197 |
| 3,707,872 | 1/1973 | Masson et al. | 73/197 |
| 4,100,799 | 7/1978 | Bradham, III et al. | |
| 4,100,800 | 7/1978 | Pelt | 73/197 |
| 4,175,434 | 11/1979 | Bradham, III et al. | 73/197 |
| 4,217,929 | 8/1980 | Pelt | 73/197 |
| 4,429,571 | 2/1984 | Kullman et al. | 73/197 |
| 4,437,344 | 3/1984 | Karjalainen | 73/197 |
| 5,517,855 | 5/1996 | Dewald | 73/197 |

FOREIGN PATENT DOCUMENTS

| | | |
|---|---|---|
| 2021782 | 11/1970 | Germany . |
| 3732703 | 9/1988 | Germany . |
| 3924147C2 | 1/1991 | Germany . |

*Primary Examiner*—George M. Dombroske
*Assistant Examiner*—Jewel Thompson
*Attorney, Agent, or Firm*—Jordan and Hamburg

[57] ABSTRACT

A combination water meter comprises a main meter which can be connected to a water main for determining larger amounts of water flow and to an auxiliary meter which is disposed in a bypass conduit for determining smaller amounts of water flow. An on-off valve insert, which opens the passageway through the water main when a specified pressure is reached, is disposed in series with the measurement insert of the main meter, and the measurement insert of the main meter as well as the auxiliary meter are disposed in a housing having a partition which divides the housing into an upstream chamber and a downstream chamber and has an opening between the two. The lid of the housing and the inserts are connected in such a manner that they can be dismantled as a unit. The partition is fastened to and preferably integrally molded with the lid and sealed with respect to the housing by means of a gasket. The measurement insert of the main meter and the auxiliary meter are both fastened to the lid on the upstream side of the partition, and the bypass conduit, which is located within the upstream chamber, is a short connecting pipe which connects the outlet of the auxiliary meter with the downstream chamber.

31 Claims, 8 Drawing Sheets

COMBINATION WATER METER

BACKGROUND OF THE INVENTION

The invention relates to a combination water meter comprising a main meter which can be connected to a water main for determining larger amounts of water flow and to an auxiliary meter which is disposed in a bypass line for determining smaller amounts of water flow. An on-off valve insert opens the passageway through the water main when a specified pressure is reached and is disposed in series with the measurement insert of the main meter. The measurement insert of the main meter as well as the auxiliary meter are disposed on a housing with a partition which divides the housing into an upstream and a downstream chamber and has an opening between the two. The lid of the housing and the inserts are connected in such a manner that they can be dismantled as a unit.

In the case of such a compound water meter, which is disclosed in U.S. Pat. No. 4,437,344, the partition is integrally molded at the housing, the main meter and the auxiliary meter being on opposite sides of the lid. The on-off valve insert is mounted directly on the side of the partition opposite the measurement insert of the main meter.

On the one hand, this known construction of the combination water meter has a relatively complicated structure; the gasket for the measurement insert of the main meter, which is fastened to the lid, is complex and therefore susceptible to breakdowns. Moreover, the measurement insert is threaded through an opening into the housing when the lid is closed and should lie tightly against the opposite sealing surface of the partition merely by being shifted. This requires a certain tilting and/or shifting in order to actually achieve a tight seat.

Furthermore, such a combination water meter cannot be constructed with a certifiable insert, the parts of which, suspended from the lid, can be calibrated to begin with as a separate component which is then simply nevertheless placed upon the housing which, as in the past, is permanently installed in the water main and closed off merely by sliding valves in order to carry out the calibration of the combination water meter at regular-intervals. F or the combination water meter of U.S. Pat. No. 4,437,344, this is prevented merely by the fact that the on-off valve insert is permanently attached to the partition, which is connected in one piece with the housing, and thus cannot be installed and dismantled as an exchangeable part suspended from the lid.

German patent DE 39 24 147 C2 discloses a combination water meter with a certifiable insert, for which all the parts, which are to be calibrated, that is, also the on-off valve insert, are suspended from the lid and are installed and dismantled together with this lid. For the combination water meter of this German patent the auxiliary meter is constructed outside of the housing in the U-shaped bypass line, which is cast in a complicated manner and which serves for supplying water and connecting chambers of the lid. In conjunction with the complicated fastening of the auxiliary meter between the coaxially opposite connecting pieces of the bypass line, this requires an enormous constructional expenditure. Moreover, the bypass line must furthermore be extremely thick and stable in order to withstand the high operation pressures of 16 bar (test pressures are even greater than 30 bar).

SUMMARY OF THE INVENTION

It is therefore an object of the present invention to develop a combination water meter of the initially described type in such a manner that, for a very simple construction, which is therefore also not susceptible to breakdowns, the lid, together with the measuring equipment suspended therefrom, can be constructed as a certifiable insert.

Pursuant to the invention, this objective is accomplished owing to the fact that partition is fastened to the lid and sealed by gaskets from the housing that the measuring insert of the main meter and that of the auxiliary meter are both fastened to the lid at the upstream side of the partition and that the bypass line is a short connecting pipe, which connects the outlet of the auxiliary meter, the inlet of which lies within the insert recess of the lid, with a recess in the partition and lies within the upstream chamber.

An extremely compact construction results from the inventive development, the arrangement of the bypass line within the wet space having the great advantage, that this bypass line must withstand only the pressure difference between the upstream chamber and the downstream chamber, which amounts to about 1 bar. The bypass line, which lies outside of the housing in accordance with the German patent mentioned above, must withstand the full operating pressure of 16 bar (and test pressures even in excess of 30 bar). For the inventive construction, this means that the short connecting pipe, forming the bypass line, can be constructed with very thin walls. Compared to the compound water meter of U.S. Pat. No. 4,437,344, there is, aside from the advantage that the inventive compound water meter has a certifiable insert, the additional advantage that the sealing, when the lid is put in place, can be brought about much more easily, since the sealing of the partition in the housing by a quasi peripheral seal placed on the end edge can be realized appreciably more easily and more reliably than the complicated seal of the measurement insert of the main meter in contact with the partition attached to the housing.

In order to make the construction even shorter and more compact by offsetting the main meter and the auxiliary meter even more on the lid in the flow direction, so that, conversely, they can be brought more closely together in the transverse direction, provisions can be made in a development of the invention so that the partition is angled essentially Z-shaped and that the auxiliary meter is disposed directly above the lower main section of the partition seated on the bottom of the housing while the connecting pipe of the bypass line discharges into the angled intermediate piece.

Moreover, a control valve for controlling the switching point of the on-off valve insert can be connected in a known manner in series with the auxiliary meter, this control valve preferably being disposed in the bypass line, if possible directly behind the outlet of the auxiliary meter.

Such a control valve can be constructed advantageously as a check valve so that, even under unfavorable conditions, the water cannot flow back over the bypass line and, with that, a backwards metering is prevented.

Instead of the previously addressed control valve in the bypass line for controlling the switching point of the on-off valve insert, it is also possible, pursuant to a further development of the present invention, to make provisions so that the bypass line discharges in an appropriately constructed on-off valve insert and, in this manner, there is a direct control of the switching point, for which the control valve can be avoided, however at the expense of an on-off valve insert of correspondingly complicated construction.

The combining pipe, forming the bypass line, can be integrally molded at the partition as well as produced as a separate component, preferably of plastic, which is attached to the partition, preferably detachably and particularly with bolts. This separate production and fastening of the connecting pipe to the partition simplifies the casting of the lid. Furthermore, it enables the connecting pipe to be constructed from a different, less expensive material, such as, preferably, plastic. This is possible only due to the inventive arrangement of the connecting pipe within the wet space since, for the inventive construction, the connecting pipe need withstand pressures of, at most, about one bar.

Finally, it is also within the scope of the invention to provide an insert, preferably of brass, in the lid for accommodating the complete measuring cartridge of the auxiliary meter.

Further advantages, distinguishing features and details of the invention arise up of the following description of two examples as well as from the accompanying drawings.

DESCRIPTION OF THE PREFERRED EMBODIMENT

Figure 1:
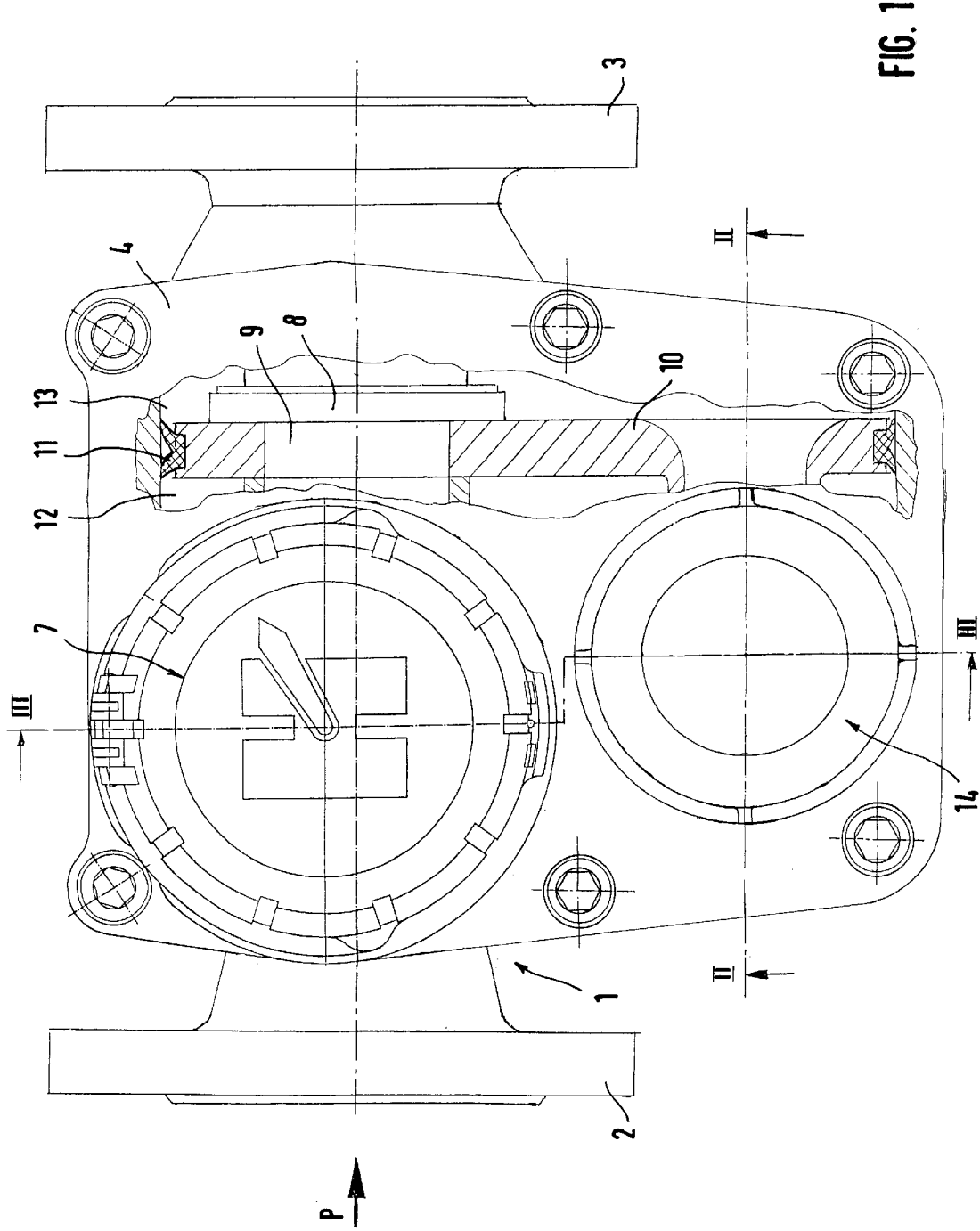
FIG. 1 shows a plan view from above of the lid of an inventive combination meter.
Figure 3:
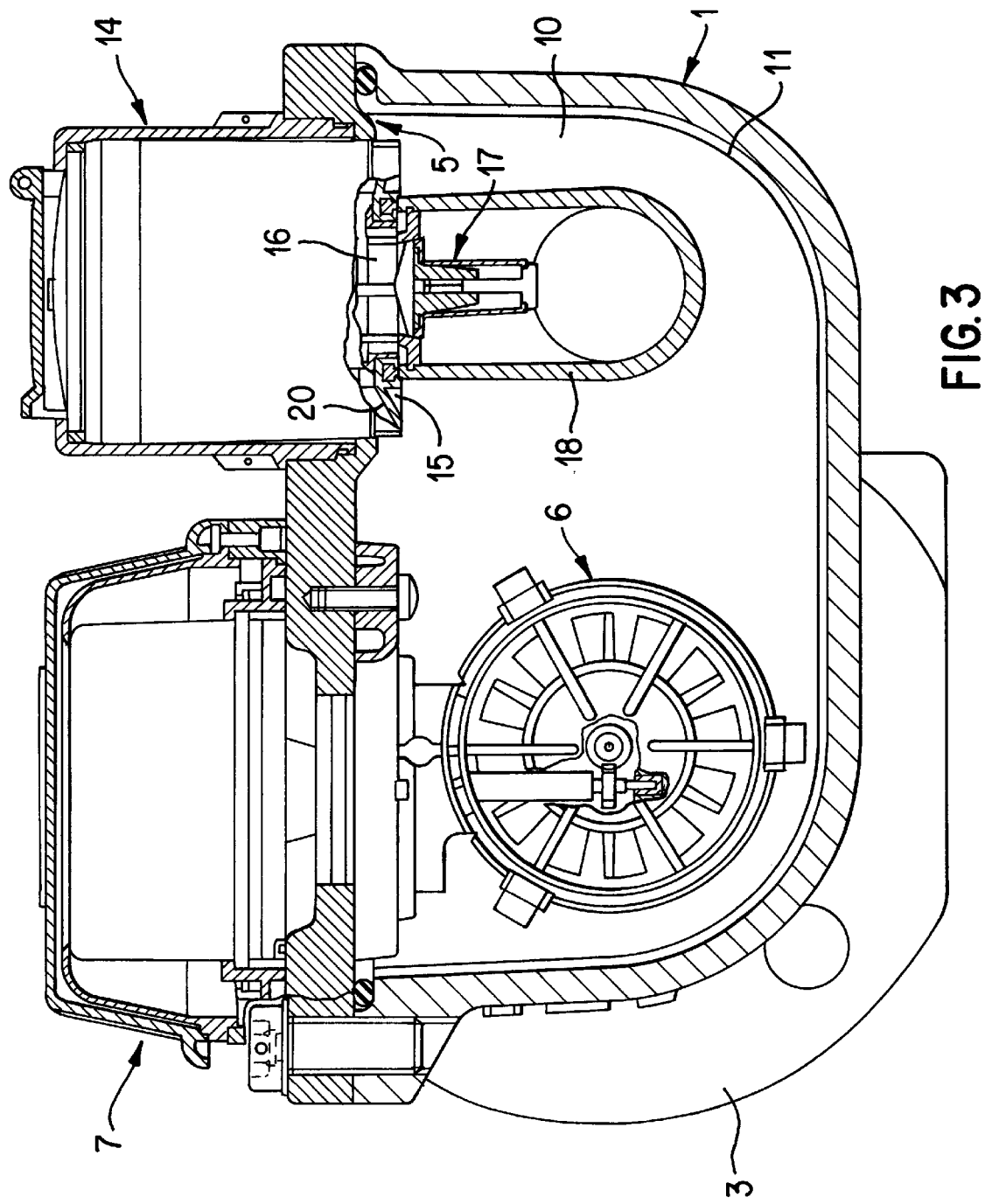
FIG. 3 shows a main meter and the auxiliary meter.

For the first example of an inventive combination meter of FIGS. 1 and 3, a housing 1 is provided with an inlet flange 2 and an outlet flange 3, between which the liquid, which is to be measured, flows in the direction of arrow P. At the lid 4, which tightly closes off a large opening 5 on the upper side of the housing 1, on the one hand the measurement insert 6 of the main meter 7 and, on the other the on-off insert 8 are fastened which, when a specified pressure is reached, opens up and frees passage through the main pipeline, that is, between the inlet flange 2 and the outlet flange 3 directly over the measurement insert 6 and the on-off valve insert 8, as well as frees passage through the opening 9 of a partition 10, which is disposed between the two flanges 2, 3. The partition 10 is fastened to and preferably integrally molded directly with the lid 4. At the end edges of the partition 10, a U-shaped, peripheral gasket 11 is provided which, when the lid is put in place and the partition engages the housing, divides this housing into an upstream chamber 12 and a downstream chamber 13. Aside from the main meter 7 and the measurement insert 6 suspended from it, the auxiliary meter 14 is also fastened to the lid at the upstream side of the partition 10, that is, within the upstream chamber 12. The water can flow from the upstream chamber 12 in the direction of the arrows into an annular inlet 15 and flow out once again through a central outlet 16 over a control valve 17 directly adjoining thereon. The control valve lies within a connecting pipe 18, which forms the bypass line for the auxiliary meter and connects the outlet 16 of the auxiliary meter with an opening 19 in the partition. The control valve 17, by means of which the switching point of the on-off valve insert 8 is controlled, preferably is constructed at the same time as a check valve. An inlet screen in the annular inlet opening 15 of the auxiliary meter can be seen at 20.

The inventive construction results in a very compact combination meter, the lid of which, with the measurement units attached thereto, can be calibrated separately and therefore constructed as a certifiable insert which, when such a meter is calibrated again, merely requires the lid with the components suspended therefrom to be exchanged for a new, calibrated component. With that, it is no longer necessary to dismantle the combination water meter from the pipe line.

The connecting pipe 18 can be constructed as a simple, thin-walled pipe, since it must merely withstand the pressure difference between the upstream chamber 12 and the downstream chamber 13, that is, about one bar, and not the whole operating pressure, as is the case when the bypass line runs outside of the housing 1, as it does in the case of the known combination water meters.

Figure 2:
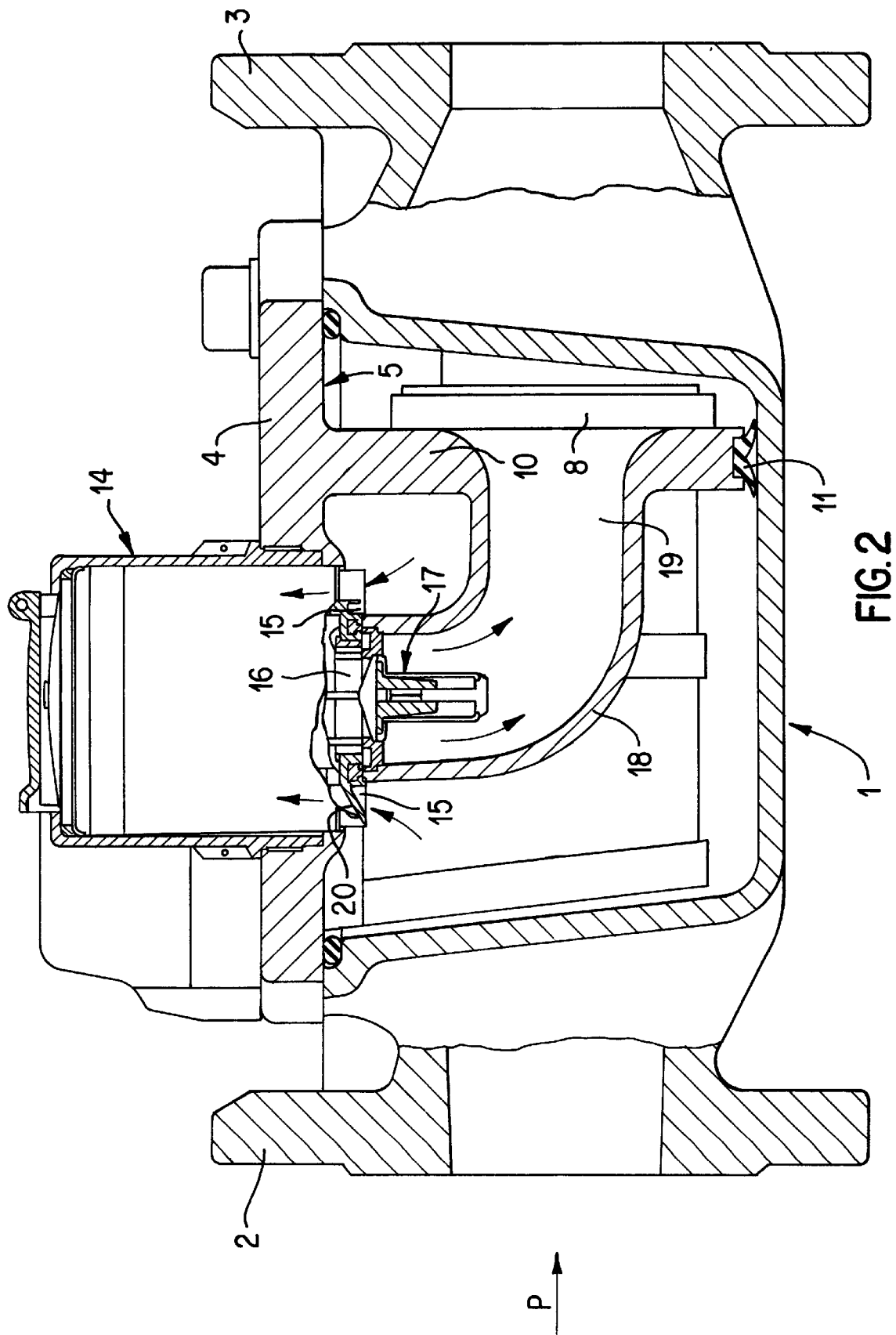
FIG. 2 shows a section along the line II—II in FIG. 1.
Figure 4:
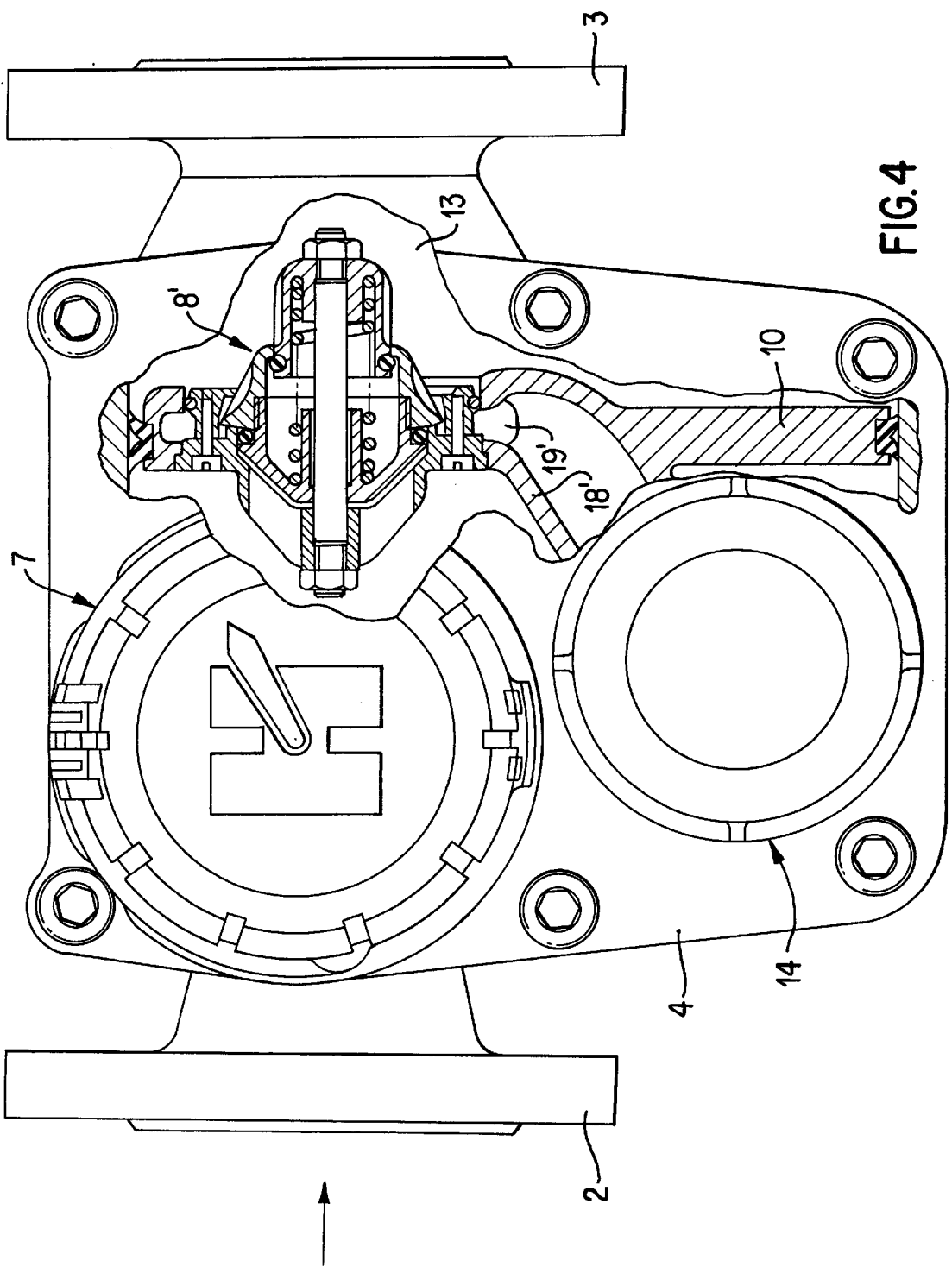
FIG. 4 shows a partially broken open aspect of a second embodiment for which the connecting pipe of the bypass line does not protrude directly into the downstream chamber but protrudes into the on-off valve insert for supporting the switching point.

The example of FIG. 4 differs from that of FIG. 3 essentially owing to the fact that a different on-off insert valve 8 is used, for which the switching point is controlled not by a control valve 17, as it is in the case of FIGS. 1 to 3 but, owing to the fact that the water of the auxiliary meter, that is, the water of the connecting pipe 18' is not discharged directly into the downstream chamber 13, but is discharged into the on-off valve insert 8' and reaches the downstream chamber 13 only from this insert 8'. In other respects, the combination water meter of FIG. 4 is constructed similarly to that of FIGS. 1 to 3.

Figure 5:
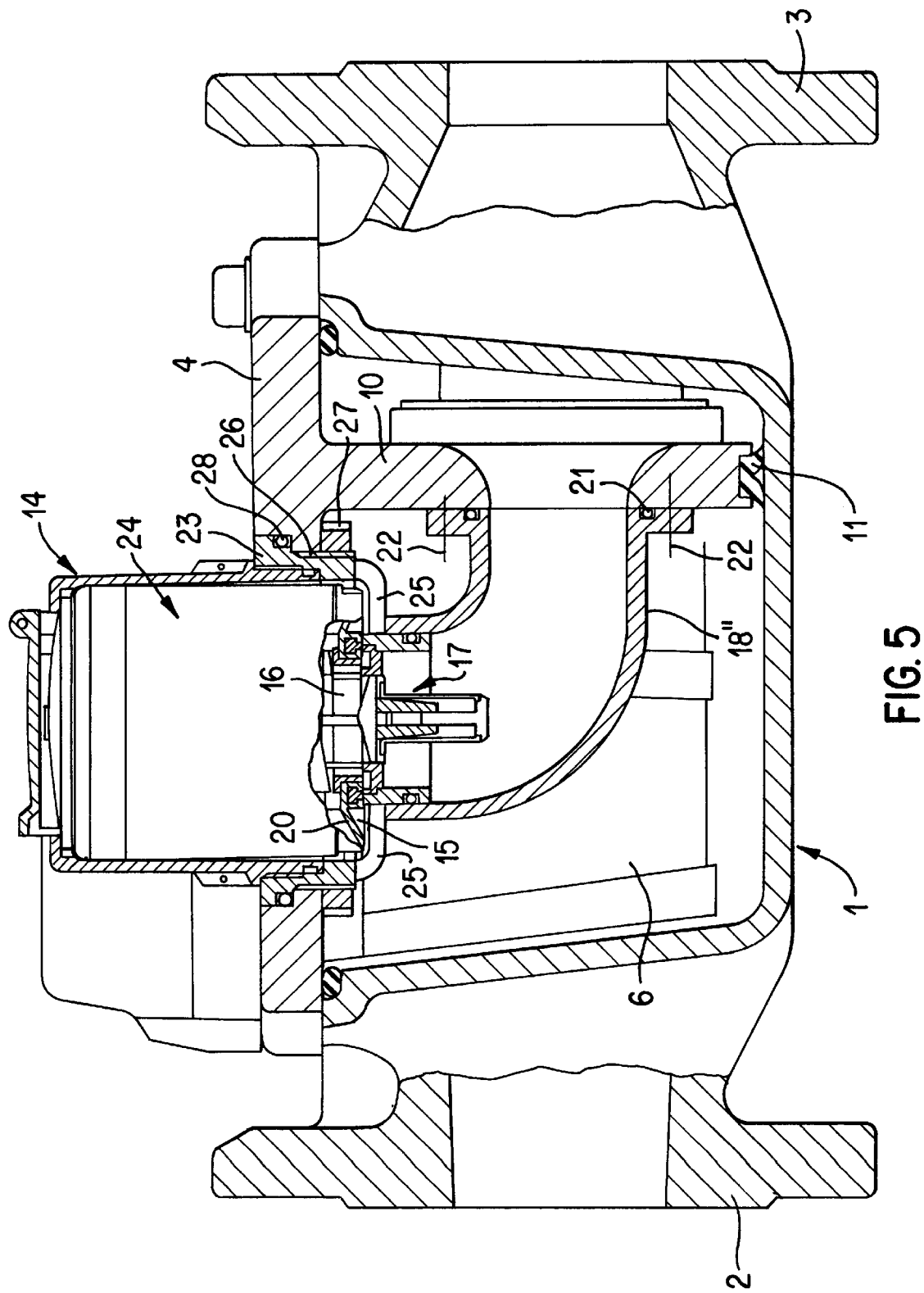
FIG. 5 shows a section through a third embodiment of an inventive combination meter corresponding to FIG. 2.

The embodiment of an inventive combination water meter of FIG. 5 differs from that of FIGS. 1 to 3, on the one hand, owing to the fact that the connecting pipe 18" is not integrally molded to the partition 10 but is a separate component, preferably of plastic, which, over a gasket 21, is in contact with the partition and, as indicated at 22, is fastened by screws to the partition. Moreover, an insert 23, which is in the form of a brass bushing and improves the exchanging of the complete measuring cartridge 24 of the auxiliary meter 14, is placed in the lid 4 of the combination meter of FIG. 5. Reinforcing ribs can be seen at 25. The insert 23, constructed as a brass bushing, is fastened with compression of a gasket ring 28 to the lid 4 by a threaded ring 27, which is screwed on to a threaded section 26.

Figure 6:
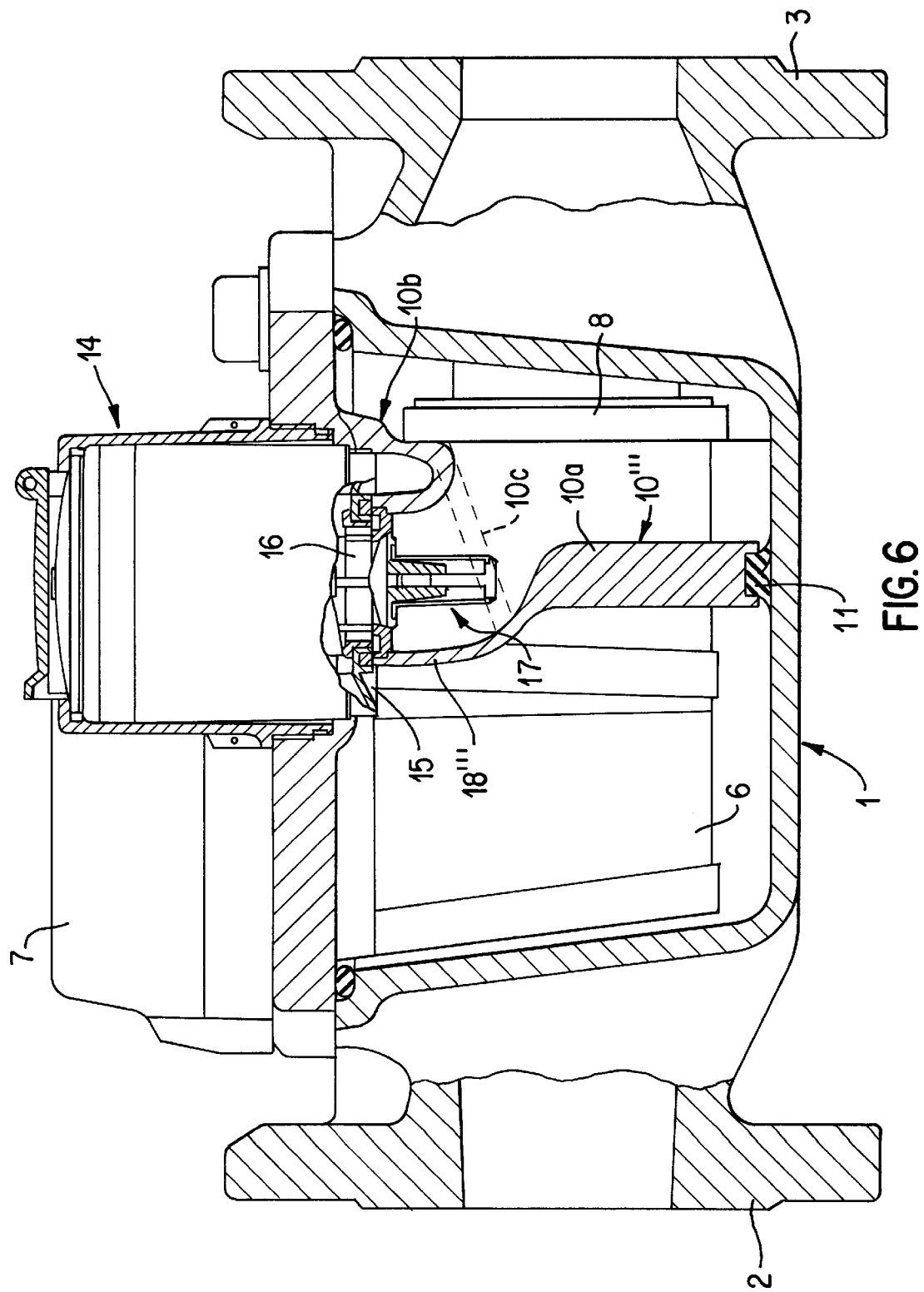
FIG. 6 shows a section through a fourth embodiment corresponding to FIGS. 2 and 5.

The embodiment of an inventive combination water meter, indicated in FIG. 6, comprises an essentially Z-shaped, angled partition 10'''with a lower section 10a and an upper section 10b, which are connected to one another by an intermediate section 10c. This angled construction of a partition 10''' enables the auxiliary meter 14 to be disposed directly above the lower main section 10a of the partition and, with that, makes possible a greater longitudinal offsetting of the auxiliary meter 14 with respect to the main meter 7, so that conversely the two meters can be moved closer to one another in the longitudinal median plane and, with that, an even more compact construction can be achieved.

Figure 7:
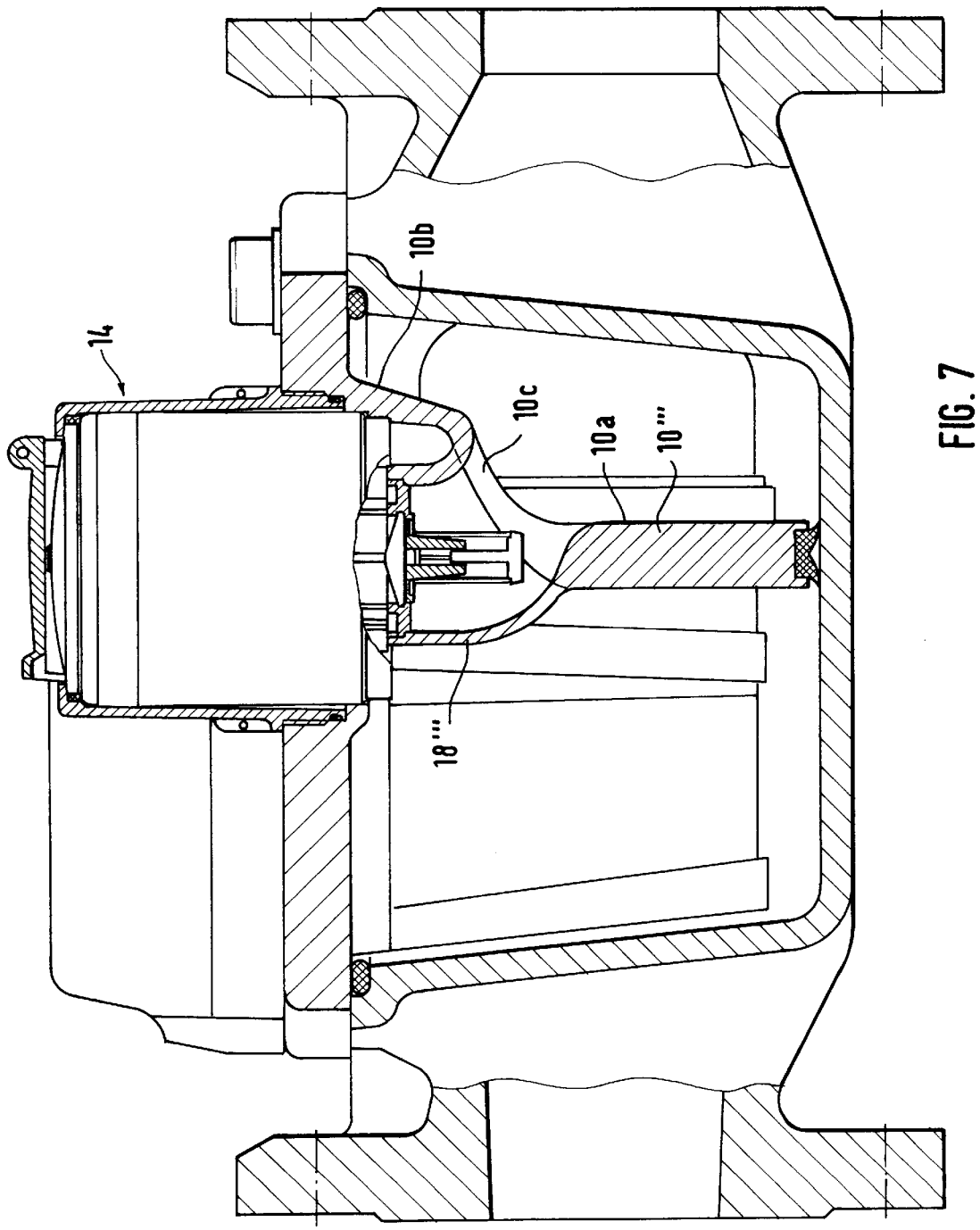
FIG. 7 shows a section through a fifth embodiment corresponding to FIG. 6 and similar to this fourth embodiment.
Figure 8:
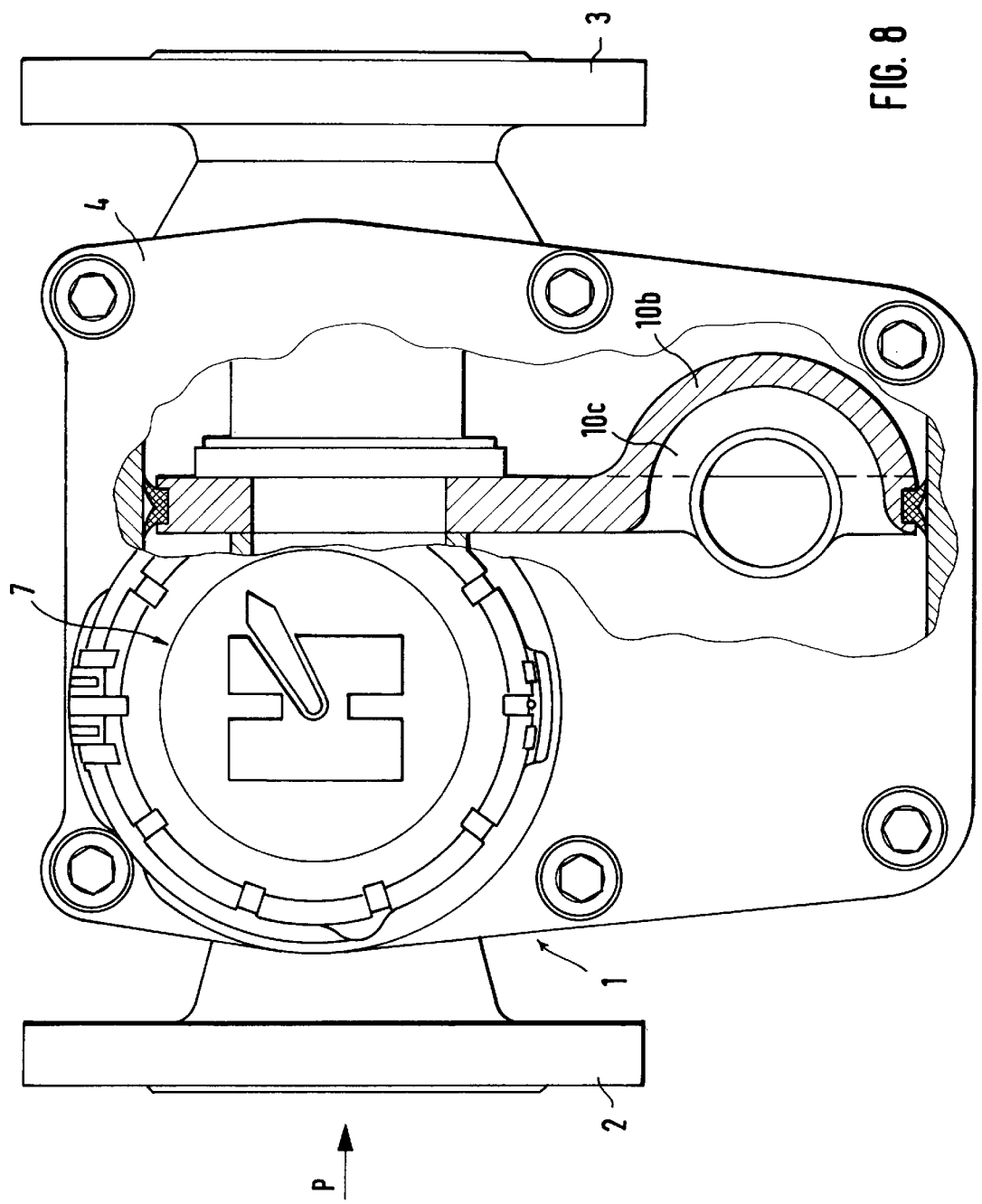
FIG. 8 shows a plan view, corresponding to the plan view of FIG. 1, of the embodiment of FIG. 7.

The further embodiment of an inventive combination meter, indicated in FIGS. 7 and 8, basically corresponds to the construction of the embodiment of FIG. 6. However, in a deviation from that embodiment, the partition 10''' is not constructed completely Z-shaped. Instead, it is merely provided with an angular bulge 10b, 10c into which the connecting pipe 18''' discharges. Here also, the auxiliary meter 14 is disposed directly above the lower main section 10a of the partition.

What we claim is:

1. A combination water meters, comprising:
   a housing having an inlet and an outlet, a main passage in said housing leading from said inlet to said outlet,
   a lid attached to said housing,
   a partition carried on said lid, said partition being disposed transverse to said main passage and engagable along a periphery thereof with an interior of said main passage, said partition dividing said main passage into an upstream chamber and a downstream chamber,
   a main meter on said lid having a main meter measurement insert mounted on said lid and disposed in said upstream chamber,
   an on-off valve insert mounted on said lid having an open position and a closed position, said on-off valve insert being in its open position to open said main passage when a specific pressure is reached,
   said partition having a opening which is open when said on-off valve insert is in said open position,
   an auxiliary meter mounted on said lid at least a portion of which is disposed on a side of said lid corresponding to said upstream side, said auxiliary meter having an inlet communicating with said upstream chamber, said auxiliary meter having an outlet,
   a bypass conduit fixed to said partition and communicative with said downstream chamber therethrough, said bypass conduit being disposed within said upstream chamber of said housing and connecting said outlet of said auxiliary meter with said downstream chamber such that water can pass from said upstream chamber to said bypass conduit into said downstream chamber when said on-off valve insert is in said closed position.

2. A combination water meter according to claim 1 wherein the meter is operable to meter large amounts of water flow when said on-off valve insert is in said open position and the water passes through said main passage, said main meter insert and said opening in said partition to said downstream chamber and the meter is operable to meter smaller amounts of water flow when the on-off valve insert is in said closed position and the water flow passes from said upstream chamber to said auxiliary meter inlet, said auxiliary meter and said bypass conduit to said downstream chamber.

3. A combination water meter according to claim 1 wherein said main meter measurement insert, said on-off valve insert, and said bypass conduit are all mounted on said lid and are removable from said housing as a unit when said lid is removed from said housing.

4. A combination water meter according to claim 1 wherein said main meter, said main meter measurement insert, said on-off valve insert, said auxiliary meter, said bypass conduit and said partition are all mounted on said lid and are all removable from said housing as a unit when said lid is removed from said housing.

5. A combination water meter according to claim 1 further comprising sealing means sealing said partition to said housing.

6. A combination water meter according to claim 5 herein said sealing means comprises a gasket.

7. A combination water meter according to claim 1 wherein said partition is integral with said lid.

8. A combination water meter comprising a housing having an inlet and an outlet, a main passage in said housing leading from said inlet to said outlet, a lid attached to said housing, a partition attached to said lid, said partition dividing said main passage into an upstream chamber and a downstream chamber, a main meter on said lid having a main meter measurement insert mounted on said lid and disposed in said upstream chamber, an on-off valve insert mounted on said lid having an open position and a closed position, said on-off valve insert being in its open position to open said main passage when a specific pressure is reached, said partition having a opening which is open when said on-off valve insert is in said open position, an auxiliary meter on said lid having an inlet communicating with said upstream chamber, said auxiliary meter having an outlet, a bypass conduit mounted on said partition, said bypass conduit being disposed in said upstream chamber of said housing and connecting said outlet of said auxiliary meter with said downstream chamber such that water can pass from said upstream chamber to said bypass conduit into said downstream chamber when said on-off valve insert is in said closed position, said partition having a generally Z-shaped cross-sectional configuration having a lower main section disposed at the bottom of the housing, an upper section disposed at the upper portion of the housing and an angled intermediate section extending between said lower section and said upper section, said auxiliary meter being disposed directly above said lower main section.

9. A combination water meter according to claim 1 wherein said auxiliary meter is seated on a single pipe connection.

10. A combination water meter according to claim 1 further comprising a control valve disposed in series with said auxiliary meter for controlling the switching point of the on-off valve insert.

11. A combination water meter according to claim 10 wherein said control valve is disposed in said bypass conduit.

12. A combination water meter according to claim 10 wherein said control valve is disposed juxtaposed to the outlet of said auxiliary meter.

13. A combination water meter according to claim 10 wherein said control valve is a check valve.

14. A combination water meter according to claim 1 wherein said bypass conduit discharges into said on-off valve insert.

15. A combination water meter according to claim 1 wherein said bypass conduit is integrally molded with the partition.

16. A combination water meter according to claim 1 wherein said bypass conduit is made as a separate component from said partition.

17. A combination water meter according to claim 16 further comprising fastening means fastening said bypass conduit to said partition.

18. A combination water meter according to claim 1 wherein said bypass conduit is made of a plastic material.

19. A combination water meter according to claim 1 further comprising a mounting insert which accommodates the auxiliary meter and which is detachably mounted on the lid for facilitating exchange of the auxiliary meter.

20. A combination water meter according to claim 19 wherein said mounting insert is made of brass.

21. A combination water,comprising:
   a housing having opening along a side thereof, said housing having an inlet and outlet at opposed ends thereof, said housing including a main passage leading from said inlet to said outlet;
   a lid mounted to said housing for closing said opening;

a transverse partition carried on said lid and extending crosswise said main passage, said transverse partition dividing said main passage into an upstream chamber and a downstream chamber and being engagable along a periphery thereof with an interior of said main passage;

valve means for selectively opening said main passage when a specific pressure is reached;

a main meter mounted on said lid, said main meter including main meter measurement insert disposed in said upstream chamber, said main meter measurement insert being responsive to flow through said main passage when said valve means is opened;

an auxiliary meter mounted on said lid, said auxiliary meter including an inlet and an outlet, said inlet having an opening into said upstream chamber; and a bypass conduit disposed within said upstream chamber of said housing, said bypass conduit being communicative with said outlet of said auxiliary meter and with said downstream chamber through said transverse partition, such that water can pass from said upstream chamber through said auxiliary meter and into said downstream chamber via said bypass conduit when flow through said main passage is prevented by said valve means.

22. A combination water meter according to claim 21, wherein said inlet and said outlet of said auxiliary meter are disposed on a side thereof facing inward of said upstream chamber.

23. A combination water meter according to claim 21, wherein said transverse partition is integrally molded with said lid.

24. A combination water meter according to claim 21, further comprising a control valve connected in series with said auxiliary meter, said control valve including means for selectively controlling a value of said specific pressure required to open said valve means.

25. A combination water meter according to claim 24, wherein said control valve is disposed in said bypass conduit.

26. A combination water meter according to claim 24, wherein said control valve is operable as a check valve.

27. A combination water meter according to claim 21, wherein said bypass conduit discharges into said downstream chamber through a portion of said valve means, said portion of said valve means including means for selectively controlling a value of said specific pressure required to open said valve means.

28. A combination water meter according to claim 21, wherein said bypass conduit is integrally molded with said transverse partition.

29. A combination water meter according to claim 21, wherein said bypass conduit is a separate component mounted to said transverse partition.

30. A combination water meter according to claim 21, wherein said bypass conduit is a separate component mounted to said transverse partition.

31. A combination water meter according to claim 21, wherein said transverse partition includes an angular bulge proximal said lid, said bulge extending into said downstream chamber, said bypass conduit open to said downstream chamber at said angular bulge.

\* \* \* \* \*